J. E. MUHLFELD.
JOURNAL BEARING FOR CAR AND OTHER AXLES.
APPLICATION FILED OCT. 28, 1908.
985,437.
Patented Feb. 28, 1911.
2 SHEETS—SHEET 1.
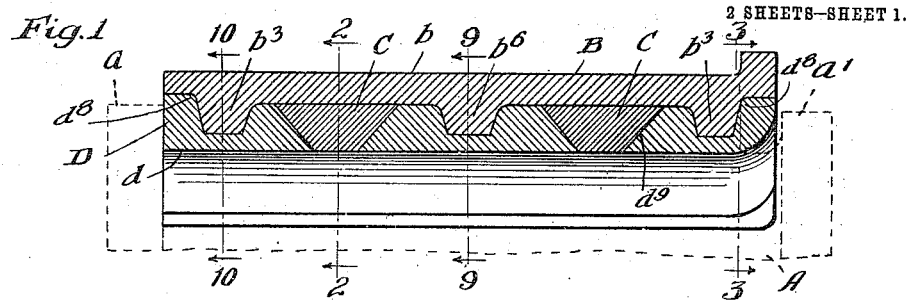
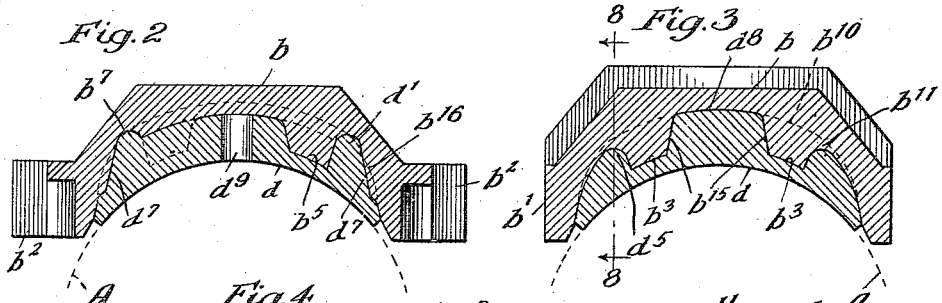
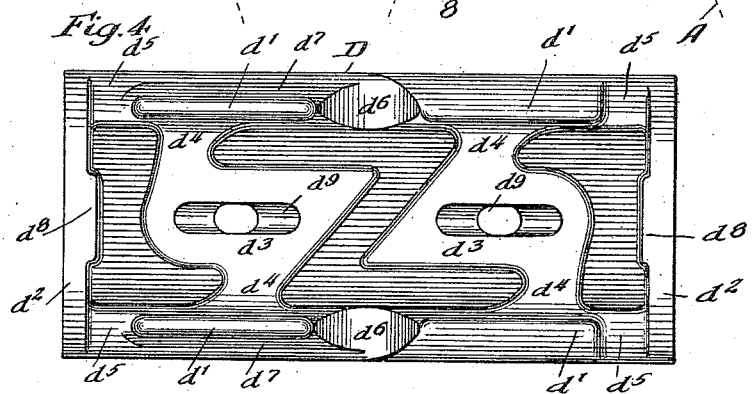
Witnesses:
Wm. Geiger
Pearl Abrams
Inventor
John E. Muhlfeld
By Munday, Evarts, Adcock & Clarke
Attorneys J. E. MUHLFELD.
JOURNAL BEARING FOR CAR AND OTHER AXLES.
APPLICATION FILED OCT. 28, 1908.
985,437.
Patented Feb. 28, 1911.
2 SHEETS—SHEET 2.
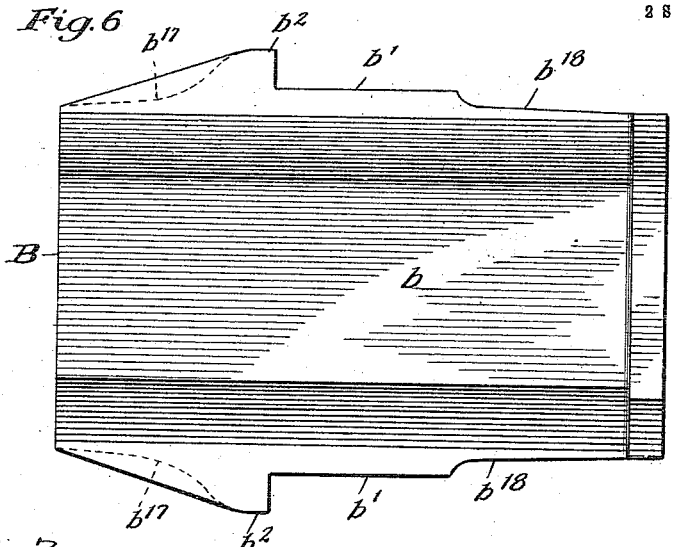
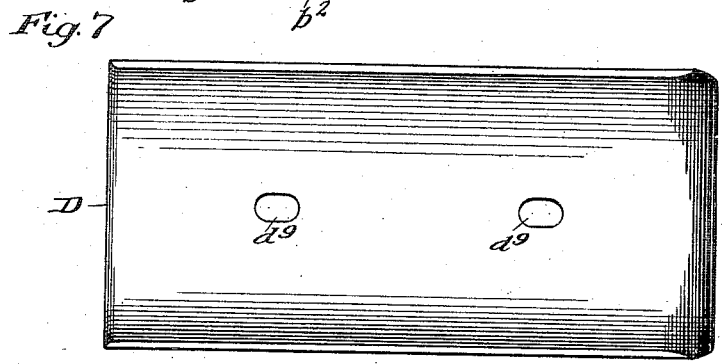
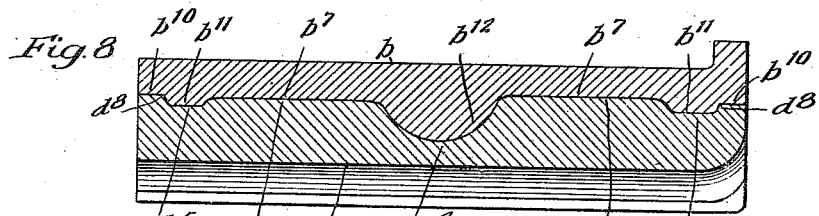
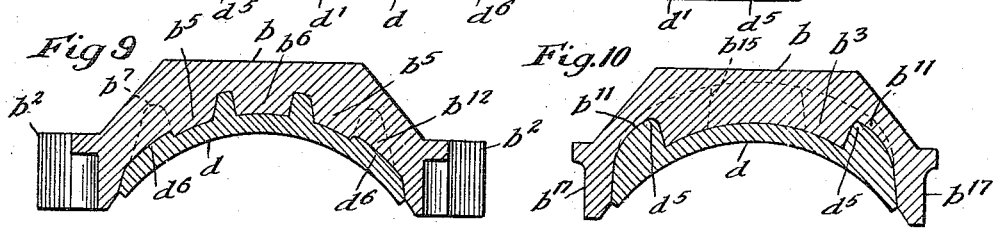
Witnesses:
Wm. Geiger
Pearl Abrams
Inventor:
John E. Muhlfeld
By Munday, Evarts, Adcock & Clarke.
Attorneys

UNITED STATES PATENT OFFICE.

JOHN E. MUHLFELD, OF BALTIMORE, MARYLAND.

JOURNAL-BEARING FOR CAR AND OTHER AXLES.

985,437. Specification of Letters Patent. Patented Feb. 28, 1911.

Application filed October 28, 1908. Serial No. 459,824.

*To all whom it may concern:*

Be it known that I, JOHN E. MUHLFELD, a citizen of the United States, residing in the city of Baltimore and State of Maryland, have invented a new and useful Improvement in Journal-Bearings for Car and other Axles, of which the following is a specification.

My invention relates to improvements in journal bearings for car and other axles, and more particularly to improvements upon the journal bearings of my Patent No. 866,154 of Sept. 17th, 1907, of my Patent No. 904,634 of Nov. 24th, 1908, and of the patent to myself and William H. Miner, No. 905,088 of Nov. 24th, 1908.

In my present improvement, the end ribs of the removable soft metal shell are provided with keying or holding lugs which fit in corresponding recesses in the end bearing ribs on the main shell, and interfit with and engage corresponding shoulders or lugs on said end bearing ribs of the main shell to prevent the soft metal of the lining shell from flowing or crawling or squeezing out, due to the end thrust and frictional action of the journal collar or shoulder against the end ribs of the soft metal or lining shell. And these end ribs of the removable soft metal or lining shell are made thicker or deeper at the crown than the other ribs or thickened portions of the lining shell, and the end channels of the main shell correspondingly deepened so as to form extended shoulders at the ends of the main and lining shell to relieve the bearing ribs on the under side of the main shell in part from the end thrust of the journal collar and shoulder, the extended shoulders at the ends of the lining shell transferring a portion of the end thrust to the body of the main shell, and thus in part relieving the bearing ribs on the main shell from such end thrust. And to give the main shell additional rigidity and strength to resist tendency to spread at the ends, I provide the outside of the side walls of the main shell at each end with tapering enlargements or reinforcements instead of making the outside of said walls straight or parallel as heretofore.

My invention also consists in the novel construction of parts and devices, and in the novel combinations of parts and devices herein shown and described, and more particularly specified in the claims.

In the accompanying drawing forming a part of this specification, Figure 1 is a central, vertical longitudinal section of a journal bearing embodying my invention. Figs. 2 and 3 are cross sections on lines 2—2, and 3—3 respectively of Fig. 1. Fig. 4 is a detail plan view of the removable soft metal or lining shell. Fig. 5 is a bottom plan view of the main or brass shell. Fig. 6 is a top or plan view of the main shell. Fig. 7 is a bottom plan view of the removable lining or soft metal shell. Fig. 8 is a longitudinal section on line 8—8 of Fig. 3. Figs. 9 and 10 are cross sections on lines 9—9 and 10—10 of Fig. 1.

In the drawing, A represents the journal of a car or other axle, having the customary collar $a$ and shoulder $a^1$. My improved journal bearing comprises a main shell B of a hard, strong bearing metal, such, for example, as brass, and a separate piece removable soft metal or lining shell D, of a suitable bearing metal, such, for example, as a composition of lead and antimony.

The main shell B has the customary upper key contact face $b$, side walls $b^1$ and side lugs $b^2$. The main shell also has under and within its key contact face $b$, end bearing ribs $b^3$, each having an integral longitudinally extending member $b^4$, and also longitudinally extending bearing ribs $b^5$, connected by an intermediate diagonally extending bearing rib $b^6$. The main shell B is also provided with side channels $b^7$ and intermediate depressions or cavities $b^8$ connected with the side channels $b^7$ by connecting channels $b^9$. At its extreme ends the main shell B also has transversely extending end channels $b^{10}$ which are made deeper than the central depressions or cavities $b^8$. The main shell also has near each end transversely extending shallow ribs $b^{11}$, and at its middle portion transversely extending thickened portions $b^{12}$ extending from the side walls to the longitudinal bearing ribs to strengthen and brace the main shell against spreading. The end bearing ribs of the main shell are also provided in their outer end faces with recesses $b^{14}$ and shoulders or lugs $b^{15}$. The side walls of the main shell at the side-lug end thereof are also furnished with integral inward projections or thickened portions $b^{16}$. The side walls of the main shell B on the outside thereof are also furnished with tapering enlargements or reinforcements $b^{17}$ $b^{18}$ at each end portion thereof to further stiffen and strengthen the main shell and adapt it to overcome any tendency to spread at the ends.

The soft metal or lining shell D has a concave bearing face $d$ conforming or adapted to conform to the curvature of the journal, and it is provided on its upper face with marginal side ribs $d^1$, end ribs $d^2$ and central lugs or thickened portions $d^3$ having integral connecting ribs $d^4$ with the side ribs $d^1$. The side ribs $d^1$ of the lining shell D have, near the ends thereof, shallow channels or recesses $d^5$, and at the middle portion thereof, curved notches $d^6$ and longitudinally extending side depressions $d^7$. The marginal end ribs of the soft metal lining shell are furnished at the crown portion thereof with keying or holding lugs $d^8$, fitting in the corresponding recesses $b^{14}$ in the end faces of the end bearing ribs of the main shell. The central lugs or thickened portions of the soft metal lining shell are also furnished with downwardly flaring openings $d^9$ to receive a hard or solid lubricant C. The shallow transverse channels or recesses $d^5$, transversely extending notches or depressions $d^6$ in the longitudinally extending marginal ribs $d^1$ of the soft metal shell, in connection with the corresponding transversely extending shallow ribs $b^{11}$ and transversely extending thickened portion $b^{12}$ of the main shell also afford additional interfitting abutment shoulders and aid materially in resisting end thrust of the journal collars on the lining shell.

I claim:—

1. A journal bearing comprising in combination a main shell of hard, strong bearing metal, and a removable lining shell of soft bearing metal, said main shell having narrow bearing ribs on its under face at its crown portion extending in part transversely and in part lengthwise of the shell, and transversely extending depended channels at its extreme ends, and said main shell having side walls embracing and confining the outer edges of the lining shell, and said lining shell having marginal side ribs embracing the lengthwise extending bearing ribs of the main shell and transversely extending end ribs embracing the outer recessed ends of the main shell and forming extended abutment shoulders, the interfitting end ribs of said shells being provided with interengaging upright keying lugs or shoulders, substantially as specified.

2. A journal bearing comprising in combination, a main shell B, having on its under face end bearing ribs $b^3$, longitudinally extending bearing ribs $b^5$, an intermediate bearing rib $b^6$, side channels $b^7$, intermediate depressions or cavities $b^8$, connecting channels $b^9$, end channels $b^{10}$, transversely extending shallow ribs $b^{11}$, transversely extending thickened portions $b^{12}$ bridging said side channels $b^7$, and a removable soft metal lining shell D having on its upper face marginal side ribs $d^1$, end ribs $d^2$, central lugs or thickened portions $d^3$, connecting ribs $d^4$, shallow channels or recesses $d^5$, curved channels $d^6$, the end bearing ribs $b^3$ of said main shell having in their outer end faces recesses $b^{14}$ and shoulders $b^{15}$, and the end ribs $d^2$ of said lining shell having keying or holding lugs $d^8$ fitting in said recesses $b^{14}$ of the end bearing ribs of the main shell, the meeting abutment faces of said ribs and lugs or thickened portions of said main shell and lining shell being flaring to permit withdrawal of the lining shell from the main shell substantially as specified.

3. In a journal bearing, the combination of a main shell of hard, strong bearing metal having depending side walls and transversely extending channels at its extreme ends, of a separate piece removable lining shell having on its upper face marginal side ribs and marginal end ribs, said main shell having bearing ribs on its under face fitting within and abutting against said marginal end ribs and marginal side ribs of said lining shell, and said main shell being provided at its middle portion with transversely extending shallow ribs or thickened portions to strengthen and brace the main shell against spreading, said ends ribs of the lining shell having keying lugs and said main shell having recesses to receive said keying lugs on the end ribs of the lining shell, substantially as specified.

4. In a journal bearing, the combination of a main shell of hard, strong bearing metal, having depending side walls and transversely extending channels at its extreme ends, of a separate piece removable lining shell having on its upper face marginal side ribs and marginal end ribs, said main shell having bearing ribs on its under face fitting within and abutting against said marginal end ribs and marginal side ribs of said lining shell, and said main shell being provided at its middle portion with transversely extending shallow ribs or thickened portions to strengthen and brace the main shell against spreading, said end ribs of the lining shell having keying lugs and said main shell having recesses to receive said keying lugs on the end ribs of the lining shell, and said lining shell having central lugs fitting within and abutting against said bearing ribs of the main shell, substantially as specified.

5. In a journal bearing, the combination of a main shell of hard, strong bearing metal having depending side walls and transversely extending channels at its extreme ends, of a separate piece removable lining shell having on its upper face marginal side ribs and marginal end ribs, said main shell having bearing ribs on its under face fitting within and abutting against said marginal end ribs and marginal side ribs of said lining shell, and said main shell being provided at its middle portion with transversely extending shallow ribs or thickened portions to strengthen and brace the main shell against spreading, the meeting faces of said marginal end rib of the lining shell and of the adjacent bearing rib of the main shell having interengaging keying shoulders, substantially as specified.

6. In a journal bearing, the combination of a main shell of hard, strong bearing metal having depending side walls and transversely extending channels at its extreme ends, of a separate piece removable lining shell having on its upper face marginal side ribs and marginal end ribs, said main shell having bearing ribs on its under face fitting within and abutting against said marginal end ribs and marginal side ribs of said lining shell, and said main shell being provided at its middle portion with transversely extending shallow ribs or thickened portions to strengthen and brace the main shell against spreading, and said lining shell having central lugs fitting within and abutting against said bearing ribs of the main shell, the meeting faces of said marginal end rib of the lining shell and of the adjacent bearing rib of the main shell having interengaging keying shoulders, substantially as specified.

JOHN E. MUHLFELD.

Witnesses:
   T. W. BUSSE,
   J. F. PEACH.

---

Copies of this patent may be obtained for five cents each, by addressing the "Commissioner of Patents, Washington, D. C."